United States Patent [19]
Guyton

[11] 3,785,723
[45] Jan. 15, 1974

[54] METHOD AND APPARATUS FOR LOCATING A PRINCIPAL MERIDIAN OF AN ASTIGMATIC OPTICAL SYSTEM

[76] Inventor: David L. Guyton, 5505 Huntington Pky., Bethesda, Md. 20014

[22] Filed: Feb. 27, 1973

[21] Appl. No.: 336,323

[52] U.S. Cl.................... 351/34, 351/36, 356/125, 356/127
[51] Int. Cl. .......................... A61b 3/02, G01b 9/00
[58] Field of Search .................. 351/17, 34, 36, 39; 356/125, 127, 128

[56] References Cited
UNITED STATES PATENTS
1,608,725  11/1926  Currier et al. ...................... 356/125
1,542,112  6/1925  Tillyer............................. 356/127 X

*Primary Examiner*—Paul A. Sacher
*Attorney*—Howard R. Berkenstock, Jr. and William C. Nealon

[57] ABSTRACT

Target means comprising a specified rotatable array of linear images of light is described for use in locating a principal meridian of an astigmatic subject optical system, where the astigmatic subject optical system comprises a patient's eye in combination with such imaging means as may be placed before it. The array of linear images of light constituting the target means is equivalent to an array of astigmatic images of point sources of light, and the array may be produced by cylindrical lens means in combination with one or more point sources of light, by slit aperture means in combination with one or more point sources of light, or entirely by slit aperture means. The target means described provides high sensitivity in locating a principal meridian even in the presence of fluctuating spherical dioptric power of the patient's eye or in the presence of minor optical irregularities of the patient's eye.

31 Claims, 22 Drawing Figures

METHOD AND APPARATUS FOR LOCATING A PRINCIPAL MERIDIAN OF AN ASTIGMATIC OPTICAL SYSTEM

BACKGROUND OF THE INVENTION

1. Field of the Invention

The invention relates generally to apparatus for determining the refractive correction for a patient's eye and relates more particularly to target means used for locating a principal meridian of an astigmatic optical system, which optical system includes a patient's eye.

2. Prior Art

Astigmatism is a common imperfection in the image-forming optics of the human eye, but is an imperfection which may be corrected quite well with cylindrical or toric spectacle lenses. Determination of the astigmatic correction for a patient's eye requires two steps. First, one of the two principal meridians of the patient's eye must be located. The second principal meridian is usually assumed to be at right angles to the first. Secondly, the refractive correction for each of the two principal meridians must be obtained. When dealing with small astigmatic errors, the more difficult step is the first, locating a principal meridian. This is the step with which the present invention deals.

Locating a principal meridian of a patient's eye is commonly accomplished with the aid of a target which is either viewed by the patient himself or is projected onto the retina of a patient's eye whereby an examiner may view the projected target image by using auxiliary optical means to view the patient's retina. Targets used for locating a principal meridian or for testing astigmatism in general are usually viewed through optical imaging means placed before the patient's eye, and therefore the astigmatism being tested for is necessarily that which may exist in such imaging means in combination with that in the eye. If the imaging means is varied to correct the eye's astigmatism, the residual astigmatism of the combination becomes less and less, and in this way even large astigmatic errors in the eye reduce to small residual errors in the process of correction.

A principal meridian of a combination with a small residual error is just as difficult to locate as a principal meridian of an eye alone with a small astigmatic error, and therefore the limitations of prior art targets in locating a principal meridian apply equally to eyes with small astigmatic errors and to eyes with partially corrected large astigmatic errors.

The location of a principal meridian of a subject optical system that includes a patient's eye is complicated by the presence of minor optical irregularities, often referred to as irregular astigmatism, which are present to a greater or lesser degree in all eyes. These minor irregularities interfere with locating a principal meridian particularly when the astigmatic error is small. A point source of light provides a most sensitive target in locating a principal meridian, but such a target is too sensitive when dealing with small astigmatic errors, for the effects of minor optical irregularities confuse its appearance. Placing several point sources of light along a diameter of a rotatable disk provides an even more useful target for locating a principal meridian, but this target is likewise confusing when dealing with small astigmatic errors. To avoid these effects of minor optical irregularities, targets giving less sensitivity have commonly been used at the expense of precision in testing. Such targets, limited in sensitivity, are line targets, usually dark lines on a white background.

Both point source targets and line targets have a further limitation. Accuracy in locating a principal meridian with these targets depends significantly on the maintenance of specified spherical correction for the eye during the testing, spherical correction which places the image of the target in a particular position relative to the patient's retina. Since the total spherical power of the eye is continuously changing due to fluctuation in accommodation, maintenance of the specified spherical correction during the testing procedure is difficult.

SUMMARY OF THE INVENTION

Accordingly, it is an object of the present invention to provide improved target means for use in locating a principal meridian of an astigmatic subject optical system, where the astigmatic subject optical system comprises a patient's eye in combination with such imaging means as may be placed before it. The object of providing the improved target means is to allow the location of a principal meridian with high precision, with little interference from minor optical irregularities, and with little interference from small errors in spherical correction during the testing procedure.

These and other objects are accomplished by target means comprising a target array in combination with rotational means for rotating the target array whereby the target array may be oriented in the various meridians of the subject optical system. The target array comprises a plurality of pairs of linear images of light where each pair is equivalent, with respect to the subject optical system, to an astigmatic image of a point source of light. That is, the two linear images of each pair are situated in different planes one behind the other, they are oriented at right angles to one another, and together they determine the distribution of light reaching the subject optical system, for only that light which is common to both of the linear images is available to be seen by the subject optical system. The pairs of linear images of light are oriented such that a first linear image of each pair is positioned along a single specified line, together these first linear images forming a single common linear image. The second linear images of the various pairs are spaced laterally from one another, such spacing substantially greater than the width of each second linear image, and are placed at such distances from the common linear image that when the common linear image is brought to an approximate focus by the subject optical system, forming a test image on the retina of the patient's eye, the test image consists of a linear array of linear segments of light meeting or overlapping one another. The various segments of light will be aligned with one another forming a substantially straight single line of light if the common linear image of the target array is oriented in a principal meridian of the subject optical system, but will be misaligned with one another forming a jagged or irregular line of light whenever the common linear image is not oriented in a principal meridian of the subject optical system. By rotation of the target array such that the orientation of the common linear image moves from one meridian to another, a principal meridian of the subject optical system is located when the test image on the retina becomes a substantially striaght single line of light.

The test image as described enables high precision in location of a principal meridian, for the adjustment endpoint makes use of the vernier or contour acuity of the eye, an acuity with which the eye can detect extremely fine misalignments or irregularities in a line. Minor optical irregularities in the eye's optics cause each linear segment of light within the test image to be slightly blurred or slightly curved at points along its length, but these deformities are effectively averaged out as the best alignment of the various linear segments with each other is obtained. Also small changes of the spherical power of the subject optical system affect the focus but not the alignment or misalignment of the various segments of the test image, whereby the alignment endpoint may be found even in the presence of small errors in spherical correction during the testing procedure.

Several embodiments of the invention utilize cylindrical lens means in combination with one or more point sources of light to produce the desired target array.

Other embodiments of the invention utilize the diffraction effect of a slit aperture on light from a point source of light to produce each pair of linear images in the target array, each pair of linear images equivalent to an astigmatic image of the point source of light.

Still further embodiments of the invention utilize combinations of slit apertures to produce the desired target array.

BRIEF DESCRIPTION OF THE DRAWINGS

Other objects, features, and advantages of the invention will be apparent from the following more detailed description of the invention wherein.

DESCRIPTION OF THE PREFERRED EMBODIMENTS

Before stating the details of the preferred embodiments of the present invention, the prior art will be closely examined in order to make clearer its relationship to the present invention.

Figure 1:
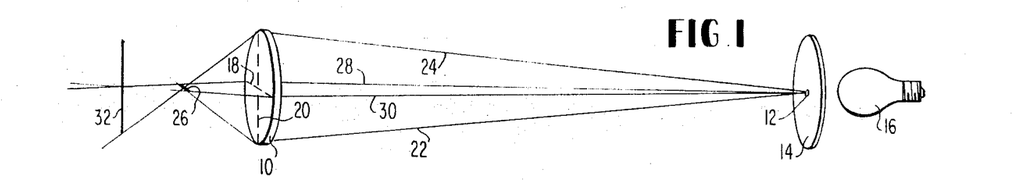
FIG. 1 is a diagrammatic perspective view of an astigmatic image of a point source of light being formed by an astigmatic optical system.

FIG. 1 shows an astigmatic lens 10 forming an astigmatic image of the point source of light formed by small aperture 12 in opaque disk 14 illuminated from behind by light source 16. The principal meridians of astigmatic lens 10 are chosen as horizontal and vertical, and their orientations are indicated by dotted lines 18 and 20. The dioptric power of lens 10 is stronger in the vertical meridian 20 than in the horizontal meridian 18.

Tracing light rays 22 and 24 from the aperture 12 through the vertical principal section of lens 10 locates the image line 26 at right angles to the vertical principal meridian 20. Tracing light rays 28 and 30 through the horizontal principal section of lens 10 locates the image line 32 at right angles to the horizontal principal meridian 18. Note that the image lines 26 and 32 are parallel to the principal meridians 18 and 20, respectively, of lens 10. Therefore determining the orientation of either image line 26 or 32 is equivalent to locating a principal meridian of lens 10, and since the two principal meridians of a regularly astigmatic lens are always at right angles to one another, both principal meridians are located by locating either one of the two principal meridians. Note that the ends of image line 26 are determined by light rays 28 and 30, and the ends of image line 32 are determined by light rays 22 and 24. For any given distance between the small aperture 12 and the lens 10, the distance of image line 26 from lens 10 is determined by the dioptric power in meridian 20 of lens 10, and the distance of image line 32 from lens 10 is determined by the dioptric power in meridian 18 of lens 10. Therefore the distance between image lines 26 and 32 is a function of the amount of astigmatism of lens 10. Greater astigmatism in lens 10 would increase the distance between the image lines 26 and 32. Especially important to note is that the greater the distance between image lines 26 and 32, the greater will be their lengths. The lengths of image lines 26 and 32 also depend on the size and shape of the effective aperture of lens 10.

Figure 2:
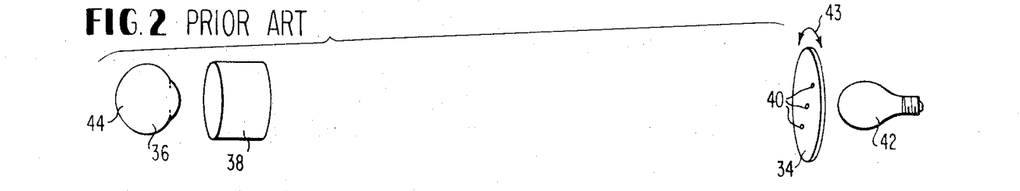
FIG. 2 is a diagrammatic perspective view of a prior art target being used for the location of a principal meridian of a subject optical system.

FIG. 2 shows a prior art target 34 being used to locate a principal meridian of a subject optical system, the subject optical system comprising the combination of eye 36 and imaging means 38. (See U.S. Pat. No. 886,772 issued to R. Dodge, May 5, 1908, for an example of this type of target). Target 34 is an opaque disk with a series of small apertures 40 arranged in a straight line along one diameter of the disk. Target 34 is illuminated from behind by light source 42, thereby causing each of the apertures 40 to appear as a point source of light to the subject optical system. Target 34 is rotatable about its center in the directions of the double arrow 43.

Imaging means 38 in FIG. 2 is a schematic representation for any one of a variety of optical means having variable dioptric power and customarily placed before a patient's eye for the purpose of correcting the refractive error of the eye or for aiding in the process of correcting the refractive error. A simple imaging means comprises individual trial lenses placed before the patient's eye. More complicated imaging means are to be found in the optical systems of optometers where the effective dioptric power correcting the eye is varied by movement of lenses or targets along the optical axis of the instrument. To simplify this discussion, imaging means 38 may be considered to comprise an individual trial lens or a combination of individual trial lenses.

It should be pointed out that imaging means 38 may or may not be astigmatic. If imaging means 38 and eye 36 are both astigmatic with the principal meridians of the two not aligned, the resultant principal meridians of the combination will be located in positions intermediate between the principal meridians of imaging means 38 and eye 36. Therefore target 34 should be considered in the general case as being used to locate a principal meridian of the combination of eye 36 and imaging means 38. Target 34 may be considered to be located in the distance with respect to eye 36, for example, located on the far wall of an examining room. On the other hand, a different distance of target 34 from eye 36 may be compensated for by the variable dioptric power of imaging means 38, and such a distance may be used equally as well from the optical point of view.

Figure 3:
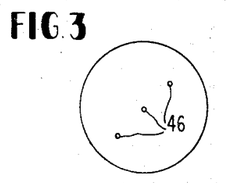
FIG. 3 is a circumscribed representation of the test image formed of the prior art target of FIG. 2 by a perfectly corrected subject optical system.
Figure 4:
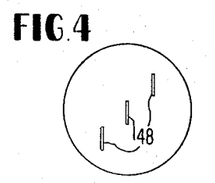
FIG. 4 is a circumscribed representation of the test image formed of the prior art target of FIG. 2 in the presence of uncorrected astigmatism in the subject optical system.
Figure 5:
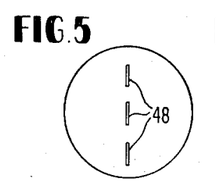
FIG. 5 is a circumscribed representation of the test image of FIG. 4 after the prior art target has been rotated to locate a principal meridian of the subject optical system.

FIGS. 3 through 6 will be used to explain the use of target 34 in locating a principal meridian of the subject optical system of FIG. 2. FIGS. 3 through 6 are circumscribed representations of test images of target 34 formed on the retina 44 of eye 36, the representations being viewed from the rear of eye 36. The test image of FIG. 3 represents the condition of perfect optical focus with no astigmatic error of the subject optical system, and consists of small round images 46 of the apertures 40. The test image of FIG. 4 represents the condition of astigmatism in the subject optical system with principal meridians horizontal and vertical. The image of each point aperture 40 consists of two image lines similar to the image lines 26 and 32 in FIG. 1. To obtain the test image of FIG. 4, the spherical power of imaging means 38 has been varied until the vertical image lines 48 of apertures 40 are in focus on the retina 44. The image lines 48 in FIG. 4 are not aligned with one another. FIG. 5 represents the condition represented by FIG. 4 wherein target 34 has been rotated until the image lines 48 are aligned with one another, thereby locating a principal meridian of the subject optical system of FIG. 2. Note that the orientation of the principal meridian is apparent from the orientation of any one of image lines 48, but that this orientation may be determined more easily and more precisely by aligning the multiple image lines 48 with one another.

Figure 6:
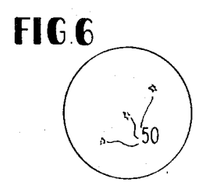
FIG. 6 is a circumscribed representation of the test image formed of the prior art target of FIG. 2 in the presence of a small astigmatic error accompanied by minor irregularities in the subject optical system.

FIG. 6 shows a test image of target 34 which is formed by a subject optical system having a small amount of astigmatism in combination with minor optical irregularities. Each image 50 is irregular in configuration and has no definite orientation. Varying the spherical dioptric power of imaging means 38 does not bring definite image lines into focus but merely changes the irregular configuration of images 50. Since only a small amount of astigmatism exists, the image lines formed of each point aperture 40 are very close together and therefore very short and cannot be definitely distinguished in images 50 from the irregular effects of minor optical irregularities in the subject optical system. Furthermore, since the image lines of each point aperture 40 are close together, small changes in the spherical dioptric power of the imaging means 38 or of the eye 36 can cause the test image on the retina to quickly change from one set of short image lines to the other set. Since the spherical dioptric power of the eye is continuously changing due to fluctuation in accommodation, the appearance of the test image may change from one moment to the next. Thus, the fluctuating spherical dioptric power of the eye and the minor optical irregularities which are present to a greater or lesser degree in all eyes are responsible for limitations in the ease and accuracy with which the prior art target as described can be used to locate a principal meridian of a subject optical system which includes a patient's eye Having thus examined closely the general principles and limitations of the related prior art, the preferred embodiments of the present invention will be described in detail.

Figure 7:
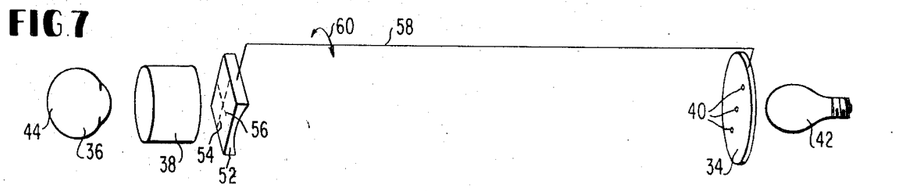
FIG. 7 is a diagrammatic perspective view of one embodiment of the present invention wherein a cylindrical lens is combined with the prior art target of FIG. 2 to produce the desired target array.

FIG. 7 shows one embodiment of the present invention wherein a cylindrical lens 52 has been added to the arrangement of FIG. 2. Cylindrical lens 52 has principal meridians as indicated by dotted lines 54 and 56. Principal meridian 54 has negative dioptric power, and principal meridian 56 has zero dioptric power. Principal meridian 54 is parallel to the row of apertures 40 in target 34, and the lens 52 and target 34 are fixed in this relationship to one another by conventional connecting means 58 shown schematically. Lens 52 and target 34 are rotatable together, however, by movement of connecting means 58 in the directions of double arrow 60. FIGS. 8 through 11 will be used to explain the function of lens 52 in aiding the location of a principal meridian of the subject optical system of FIG. 7.

Figure 8:
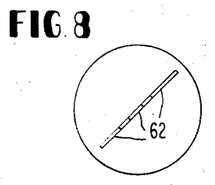
FIG. 8 is a circumscribed representation of the test image of the target array of FIG. 7 by a perfectly corrected subject optical system.

FIGS. 8 through 11 are circumscribed representations of test images of target 34 formed on the retina 44 of eye 36 in the arrangement of FIG. 7, the representations being viewed from the rear of eye 36. The test image of FIG. 8 represents the condition of the subject optical system which was represented in FIG. 3, the condition of zero spherical and astigmatic error. Lens 52, however, causes a net astigmatism in the combination of lens 52 with the subject optical system, and the test image of FIG. 8 consists of overlapping image lines 62 of the apertures 40. The image lines 62 are aligned with one another, for the row of apertures 40 is held parallel to principal meridian 54 of lens 52 by connecting means 58, and lens 52 represents the only astigmatic optical component cooperating to form the image lines 62. The dioptric power of cylindrical lens 52 is meridian 54 is chosen such that the image lines 62 will be long enough to meet or overlap one another.

Figure 9:
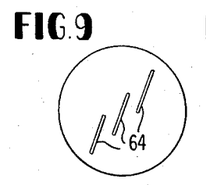
FIG. 9 is a circumscribed representation of the test image formed of the target array of FIG. 7 in the presence of uncorrected astigmatism in the subject optical system.

The test image of FIG. 9 represents the condition of astigmatism in the subject optical system of FIG. 7 with principal meridians horizontal and vertical. The spherical dioptric power of imaging means 38 has been varied to bring image lines 64 into sharp focus on retina 44. Image lines 64 are not parallel, however, to a principal meridian of the subject optical system as were the image lines 48 of FIG. 4, and neither are they parallel to principal meridian 54 of lens 52 in FIG. 7. Image lines 64 are parallel to a principal meridian of the resultant optical combination of lens 52 and the subject optical system. In general, two astigmatic optical systems in apposition but with principal meridians not in alignment behave exactly the same as a single astigmatic system with principal meridians located at intermediate positions between the principal meridians of the two optical systems. The astigmatic power of this resultant astigmatic system and the orientation of its principal meridians may be investigated mathematically by equations describing the combination of cylindrical lenses at obliquely crossed axes (see J.P.C. Southall, Mirrors, Prisms, and Lenses, 3rd edition, Dover Publications, Inc., New York 1964, under "Obliquely Crossed Cylinders"). This test image in FIG. 9 represents the effect of adding cylindrical lens 52 to the conditions previously noted for FIG. 4. The astigmatism giving rise to the test image of FIG. 4 formed each of the image lines 48 such that the ends of each image line 48 were displaced a certain distance laterally from the imaginary line joining the centers of image lines 48. The greater the astigmatism present, the longer image lines 48 would be, and the greater would be the lateral displacement of the ends of each image line. Adding lens 52 to the astigmatic subject optical system of FIG. 4 results in the test image of FIG. 9 wherein the image lines 64 are not aligned with one another. Image lines 64, however, are longer than image lines 48 and overlap one another. The lateral displacement of the ends of image lines 64 from the imaginary line joining their centers can be shown mathematically to be approximately the same as the corresponding lateral displacement of the ends of image lines 48 in FIG. 4. Therefore the effect of lens 52 is to stretch out image lines 48 in the direction of orientation of meridian 54 of lens 52, forming image lines 64. The lateral displacement of the ends of image lines 48 from the imaginary line joining their centers remains approximately the same as they are stretched out to form image lines 64.

Figure 10:
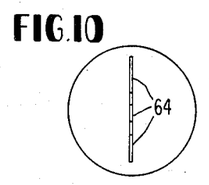
FIG. 10 is a circumscribed representation of the test image of FIG. 9 after a principal meridian of the subject optical system has been located.

The test image of FIG. 10 represents the conditions of FIG. 9, wherein target 34 and lens 52 have been rotated together by movement of connecting means 58 until image lines 64 have become aligned with one another, thereby locating a principal meridian of the subject optical system of FIG. 7. Slight adjustment of the spherical power of imaging means 38 may be necessary to keep image lines 64 sharply in focus as they are brought into alignment. Note that image lines 64 are always long enough such that they meet or overlap one another due to the presence of cylindrical lens 52 which has substantial astigmatic power in comparison to the astigmatic error of most patient's eyes. Image line 48 in FIG. 5, however, will not be long enough to meet or overlap one another when only small astigmatic errors exist in the subject optical system. The alignment of overlapping image lines is considerably easier than the alignment of a series of short separated lines primarily because the overlapping alignment makes use of the vernier or contour acuity of the patient's eye, an acuity with which the eye can detect extremely fine misalignments or irregularities in a line.

Figure 11:
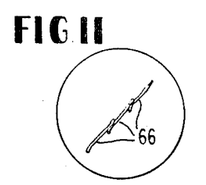
FIG. 11 is a circumscribed representation of the test image formed of the target array of FIG. 7 in the presence of a small astigmatic error accompanied by minor irregularities in the subject optical system.

FIG. 11 shows a test image of target 34 formed by the arrangement of FIG. 7 where the subject optical system has a small amount of astigmatism in combination with minor optical irregularities. The spherical dioptric power of imaging means 38 has been varied to bring the test image of FIG. 11 to its best focus. The minor optical irregularities of the subject optical system cause each of the image lines 66 to be slightly curved and slightly out-of-focus at points along its length. However, the overall orientation of each image line 66 is obvious, and the fact that these image lines are slightly misaligned with one another is readily detectable, much more so than in the case of images 50 in FIG. 6. Therefore the addition of cylindrical lens 52 causes minor optical irregularities of a subject optical system to be much less of a problem than with the prior art target alone in the location of a principal meridian of the subject optical system. In addition, the addition of cylindrical lens 52 causes the two image lines formed of each aperture 40 to be separated from one another by a substantial distance. Therefore minor changes in the spherical dioptric power of the eye, from fluctuation in accommodation, or minor error in the spherical dioptric power adjustment of imaging means 38 will not have an appreciable effect on the orientation of the image lines originally brought to a focus in the vicinity of the retina. Only the focus, not the orientation, of these image lines will change with such changes in spherical dioptric power. The fluctuation in accommodation of the eye actually helps in the adjustment process here, for such fluctuation tends to keep the image lines in best focus on the retina, partly compensating for small errors in the spherical dioptric power adjustment of imaging means 38. Previously, the images 50 in FIG. 6 did not have identifiable image lines, and the fluctuating accommodation of the eye confused rather than aided the identification of sharply focused image lines. The greatest precision in locating a principal meridian is obtained when the image lines formed on the retina are in best focus, for under this condition minimal misalignment of the image lines with one another is most easily detected.

The arrangement of FIG. 7 was chosen to explain the principles of the present invention because it relates most clearly to the easily understood prior art method shown in FIG. 2. The arrangement of FIG. 7 is only one embodiment of the present invention, however, and is not necessarily the simplest or the most basic embodiment. The basic target array described by the present invention comprises an array of linear images of light equivalent to an array of astigmatic images of point sources of light. This array of linear images is produced in the arrangement of FIG. 7 by the cylindrical lens 52 in combination with the row of illuminated point apertures 40. An actual astigmatic image of the point source of light corresponding to each aperture 40 is formed by lens 52, each of these astigmatic images comprising a pair of image lines. One of the image lines of each pair is a virtual image line lying in the plane of the target 34, intersecting the aperture 40 which gives rise to it, and oriented in the direction of the row of apertures 40. All of the virtual image lines formed in the plane of target 34 are exactly aligned with one another, overlap one another, and thereby form a single common linear image. The second image line of each pair of image lines is a virtual image line lying between target 34 and lens 52. Since the apertures 40 are spaced apart laterally from one another, the second image lines are also spaced apart laterally from one another. In the arrangement of FIG. 7 the second image lines are at right angles to meridian 54 of lens 52 and form a grid of image lines all in the same plane between target 34 and lens 52.

Figure 12:
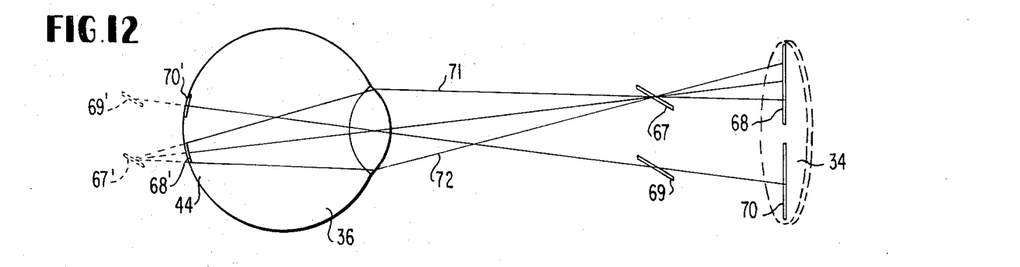
FIG. 12 is an exaggerated partial representation of the arrangement of FIG. 7, showing more clearly the spatial relationships of the target array of the present invention.

FIG. 12 is an exaggerated partial representation of the arrangement of FIG. 7 wherein the astigmatic images of two of the point apertures 40 are illustrated. The row of point apertures 40 in FIG. 7 has been oriented vertically for ease of illustration, and only the astigmatic images arising from the top and bottom apertures 40 are illustrated. The pair of image lines 67 and 68 constitute the astigmatic image of the top aperture 40, and the pair of image lines 69 and 70 constitute the astigmatic image of the bottom aperture 40. These astigmatic images are produced by the lens 52 in combination with the apertures 40, and thus, the astigmatic images replace these elements in FIG. 12. Imaging means 38 has been omitted from FIG. 12 with the assumption that the spherical dioptric power of the eye 36 is correct for the distance of the target 34.

Image lines 68 and 70 are two of the virtual image lines lying in the plane of the target 34. The center aperture 40 gives rise to a third image line which, if illustrated, would overlap image lines 68 and 70, all three image lines forming a single common linear image. Image lines 67 and 69 are the outer two image lines of the grid of virtual second image lines formed between target 34 and the subject optical system. The total array of image lines 67, 68, 69, and 70 in combination with those not illustrated constitutes the target array of the present invention. Each image line is reimaged by the subject optical system, in this case, by eye 36 where image lines 67', 68', 69', and 70' correspond to the images of image lines 67, 68, 69, and 70 respectively. Since the spherical dioptric power of eye 36 is correct for the distance of the target 34, image lines 68' and 70' are formed on the retina 44, similar to the outside two image lines 62 of FIG. 8. Image lines 67' and 69' are the projected images of image lines 67 and 69 and lie behind the retina.

Note that light rays 71 and 72, passing from right to left from image line 68 through image line 67 through the top and bottom of the effective pupil of eye 36, are refracted by the optical system of eye 36, converge toward the image line 67', are intercepted by the retina 44 and thereby determine the length of image line 68' on the retina. The length of image line 68' on the retina is important, for image line 68' must be long enough according to the present invention to meet or overlap its neighbor. To ensure this condition most effectively, image line 68 in the target array must be of sufficient length such that light rays 71 and 72 exist in the first place whereby the full height of the effective pupil of eye 36 is utilized. If image line 68 is of such length, there are then two parameters which determine the length of image line 68' on the retina. These two parameters are first the diameter of the effective pupil of eye 36, and second the distance of image line 67' from image line 68'. Therefore for a given range of expected pupil sizes, image line 67 must be far enough away from image line 68 in the target array to cause image line 67' to be located at a sufficient distance from 68' so that image line 68' is long enough to meet or overlap its neighbor. The spaces between the centers of neighboring image lines on the retina is, of course, determined by both the axial position and lateral spacing of the grid of image lines represented in FIG. 12 by image lines 67 and 69. Note that it may be advantageous to provide a test image on the retina consisting of numerous image lines centered various distances from each other to allow for a wide range of pupil sizes. This can be accomplished by simply varying the lateral spacing of the grid of image lines represented by image lines 67 and 69.

The basic target array of the present invention should now be apparent. The array consists of a plurality of pairs of linear images of light wherein one linear image of each pair, for example, image line 68 or image line 70 in FIG. 12, forms part of a single linear image common to all pairs, and the second linear images of the various pairs, for example, image lines 67 and 69 in FIG. 12, form a grid of linear images parallel to one another and at right angles to the common linear image. The second linear images may be in the same plane with one another as in FIG. 12, or may be located at different axial positions in the most general case if appropriate means are used in producing them. Furthermore the second linear images may be located between the eye and the common linear image as in FIG. 12 or may be located more advantageously on the far side of the common linear image. Placing image lines 67 and 69 in FIG. 12 on the far side of image lines 68 and 70 would cause image lines 67' and 69' to be formed in front of the retina 44. Since the eye can increase its spherical dioptric power by means of accommodation, images formed by the eye in its relaxed state move forward when the eye accommodates. Images formed in front of the retina move still further in front of the retina when the eye accommodates. If image lines 67' and 69' are originally formed in front of retina 44, the eye 36 cannot bring them into focus by accommodating, and they will therefore not provide a source of confusion when viewing the common linear image. In the arrangement of FIG. 7, the dioptric power of cylindrical lens 52 could be changed from negative to positive in order to move the image lines 67 and 69 of FIG. 12 to the far side of image lines 68 and 70. Note that if lens 52 were made strongly enough positive, image lines 67 and 69 would be moved to the "far side of infinity" which simply means that they would behave as if they were located at some distance behind the eye 36.

The basic target array of the present invention may be produced by a variety of optical means. Some of these optical means are the subjects of further embodiments of the present invention which will now be described.

Figure 13:
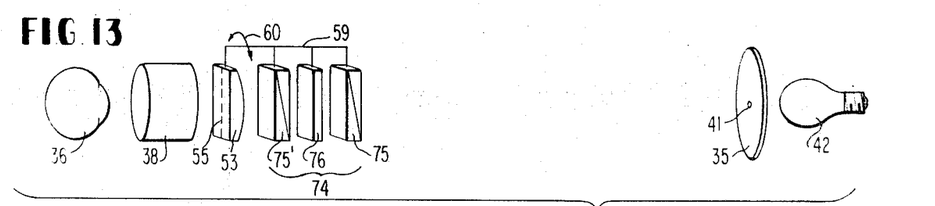
FIG. 13 is a diagrammatic perspective view of another embodiment of the present invention wherein birefringent multiple imaging means is used in combination with a single point source of light to simulate the type of prior art target used in FIG. 7.

FIG. 13 shows an arrangement similar to that of FIG. 7 except that a positive cylindrical lens 53 is used in place of the negative cylindrical lens 52, and target 35 with single point aperture 41 has replaced the target 34 with multiple point apertures 40. Multiple imaging means 74 has been added, composed of birefringent optical elements, for the purpose of forming multiple images of point aperture 41 in a line parallel to principal meridian 55 of lens 53. Multiple imaging means 74 comprises, for example, Wollaston prisms 75 and 75' and quarter wave plate 76, and is held in alignment with lens 53 by conventional connecting means 59 schematically illustrated. By means of movement of connecting means 59 in the directions of double arrow 60, lens 53 along with multiple imaging means 74 may be rotated from one meridian to another. The strengths of the Wollaston prisms 75 and 75' of the multiple means 74 are chosen such that four images of point aperture 41 are presented to lens 53, the four images in a row parallel with principal meridian 55 of lens 53. For the design of such birefringent multiple imaging systems, see W. J. Tabor, Multiple Imaging Device using Wollaston Prisms, Applied Optics 6(7):1275, July 1967. Because the multiple imaging means 74 rotates with the lens 53, the row of images of point aperture 41 rotates as well, remaining parallel to principal meridian 55. This arrangement in FIG. 13 is much preferable to that of FIG. 7, for the new target 35 does not need to be rotated and may be mounted rigidly in the distance.

Figure 14:
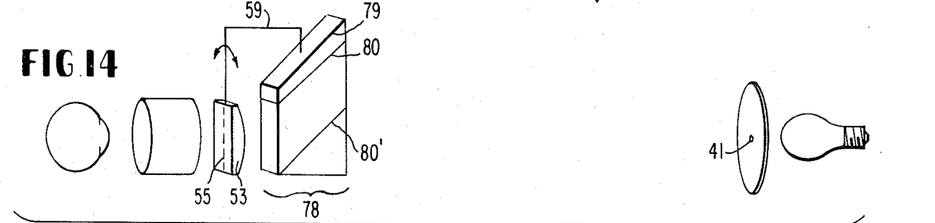
FIG. 14 is a diagrammatic perspective view of another embodiment of the present invention wherein reflecting and beam-splitting multiple imaging means is used in combination with a single point source of light to simulate the type of prior art target used in FIG. 7.

FIG. 14 shows an arrangement similar to that of FIG. 13 with the multiple imaging means now comprising an assembly of prisms 78 with a totally reflecting surface 79 and two beam splitting surfaces 80 and 80'. These three surfaces are all slightly titled with respect to one another in the forward to back direction such that three images of point aperture 41 are presented to lens 53. Conventional connecting means 59 is provided as in FIG. 13 for the simultaneous rotation of prism assembly 78 and lens 53. Obviously, various arrangements of reflecting and beam-splitting surfaces may be used to provide multiple imaging of the single point aperture 41.

Figure 15:
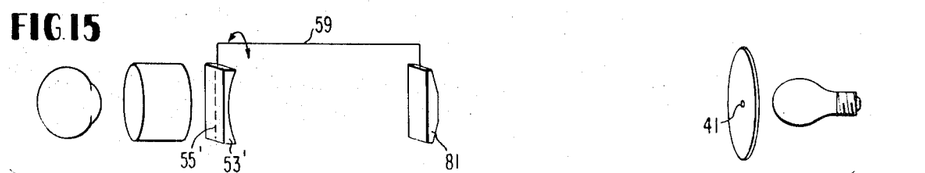
FIG. 15 is a diagrammatic perspective view of another embodiment of the present invention wherein prismatic multiple imaging means is used in combination with a single point source of light to simulate the type of prior art target used in FIG. 7.

FIG. 15 shows a further arrangement similar to that of FIG. 13 with the multiple imaging means now comprising a triprism 81 with its prismatic components disposed laterally across the field of view of the subject optical system. Triprism 81 forms a three-component prism similar to the common two-component biprism and provides three images of point aperture 41 aligned in a row parallel with principal meridian 55' of lens 53'. For greatest sensitivity, the triprism 81 must be far enough removed from the subject optical system such that the bundle of light rays refracted by each prismatic component covers the entire effective aperture of the subject optical system. Lens 53' is made to have negative power in meridian 55' to help meet this requirement. Conventional connecting means 59 connects triprism 81 with lens 53' for the purpose of providing simultaneous rotation of these elements.

Figure 16:
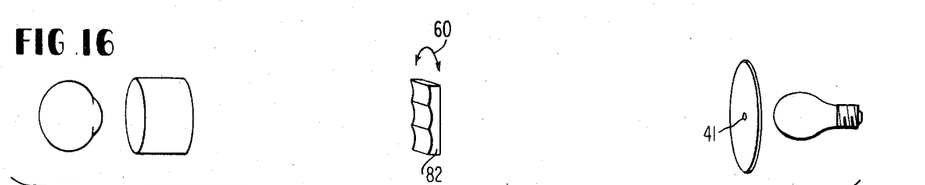
FIG. 16 is a diagrammatic perspective view of another embodiment of the present invention wherein an array of cylindrical lenses is combined with a single point source of light to produce the desired target array.

FIG. 16 shows an arrangement similar to that of FIG. 7 wherein the desired target array is provided by a single point aperture 41 in combination with a lenticular lens 82. Lenticular lens 82 comprises a plurality of long cylindrical lenses disposed side by side and may be formed from a single block of glass or plastic. Each negative cylindrical lens as illustrated, with light from point source 41, forms two image lines, one virtual image line located between the cylindrical lens and point aperture 41 and oriented parallel to the axis of the cylindrical lens, and the other image line a virtual image line located in the plane of point aperture 41, intersecting point aperture 41, and oriented at right angles to the axis of the cylindrical lens. The desired target array is thus produced. Rotation of lenticular lens 82 in the directions of double arrow 60 rotates the entire target array. The lenticular lens 82 may be of different form. For example, a block of glass having a single cylindrical surface on one side and a series of flat prismatic surfaces on the other side may be used equally as well. Also there is some advantage in leaving narrow spaces or non-refracting spaces between the individual cylindrical lenses of lenticular lens 82. Through such non-refracting spaces, the subject optical system will see the point aperture 41 appearing in the center of the test image. Such a view of point aperture 41 is valuable in binocular refractive techniques where a similar target must be seen by both eyes.

Lenticular lens 82 in FIG. 16 is similar to a prior art device, the multiple Maddox rod, used with a point source of light in the distance for binocular eye muscle balancing tests. The multiple Maddox rod, however, has always been placed quite close to the eye and has never been used for location of a principal meridian. For locating a principal meridian effectively, the multiple Maddox rod must be moved away from the eye such that the first and second image lines provided by each cylindrical lens are closer to one another, causing the image lines on the retina, similar to image lines 62 of FIG. 8, to be short enough that their ends are evident. It is the ends of the image lines 62 which are detected most precisely by the vernier or contour acuity of the eye.

FIGS. 7, 13, 14, 15, and 16 have all shown embodiments of the present invention wherein each pair of linear images of the desired target means has been produced by cylindrical lens means in combinations with a point source or an image of a point source of light. There are other ways to produce the desired array of linear images, as will now be described.

Figure 17:
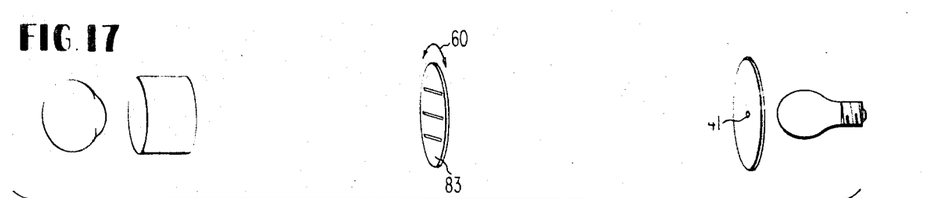
FIG. 17 is a diagrammatic perspective view of another embodiment of the present invention wherein an array of slit apertures is combined with a single point source of light to produce the desired target array.

FIG. 17 is similar to the arrangement of FIG. 16 except that the lenticular lens 82 has been replaced by an array of parallel slit apertures 83. Each slit aperture serves as one of the second linear images in the previously described desired target array. Diffraction at the edges of each slit aperture spreads out the light coming from the point aperture 41 in the direction perpendicular to the slit aperture, thereby producing a virtual linear image of light in the plane of point aperture 41, intersecting point aperture 41, oriented at right angles to the slit aperture which produced it, and serving as one of the first linear images in the previously described desired target array. The array of slit apertures 83 is rotatable in the directions of double arrow 60, causing the entire target array to rotate.

Figure 18:
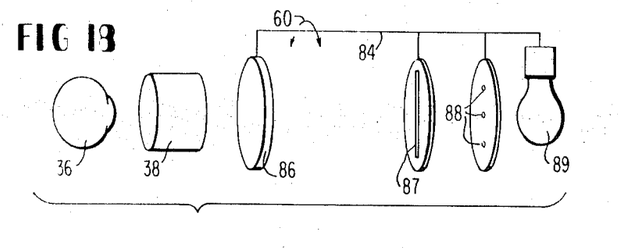
FIG. 18 is a diagrammatic perspective view of another embodiment of the present invention wherein a single slit aperture is combined with an array of point sources of light to provide the desired target array.

FIG. 18 shows a compact version of an arrangement similar to that in FIG. 17. From left to right, connected by conventional connecting means 84, are spherical lens 86, single slit aperture 87, multiple point apertures 88 aligned in a row parallel to the slit aperture 87, and light source 89. Slit aperture 87 serves as the source of the common linear image of the desired target array. Light from point apertures 88 is diffracted at slit aperture 87 in such a way as to form virtual linear images in the plane of and intersecting point apertures 88, each virtual linear image oriented at right angles to slit 87 and constituting one of the second linear images in the desired target array. Spherical lens 86 serves simply to image slit aperture 87 in the distance, for example, to form a virtual image of slit aperture 87 located in the same plane as the far wall of the examining room. Spherical lens 86 may be considered as a part of the target means as illustrated or may be considered a part of imaging means 38. By movement of connecting means 84 in the directions of the double arrow 60, the entire target array may be rotated.

Figure 19:
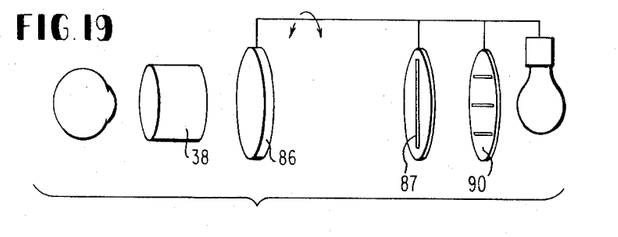
FIG. 19 is a diagrammatic perspective view of another embodiment of the present invention wherein a single slit aperture is combined with an array of slit apertures to produce the desired target array.

FIG. 19 shows the arrangement of FIG. 18 wherein the row of point apertures 88 has been replaced by an array of parallel slit apertures 90, the slit apertures oriented at right angles to the single slit aperture 87. The array of slit apertures 90 now serves as the source of the second linear images in the desired target array. Diffraction still occurs at slit aperture 87, but in such a way as to simply form virtual linear images in the same positions as slit apertures 90. The change from point apertures 88 to slit apertures 90 increases the amount of light emerging from slit aperture 87 without changing the basic distribution of this light. Thus, the desired target array of the present invention is produced by slit apertures placed in the positions where linear images of light are required.

Figure 20:
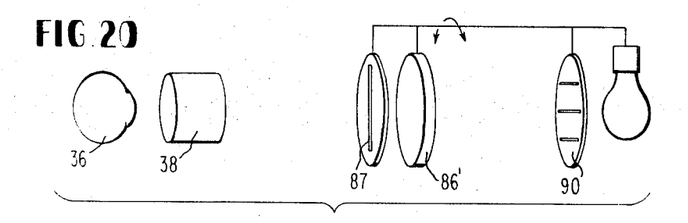
FIG. 20 is a rearrangement of the apparatus of FIG. 19, such rearrangement being particularly useful in refraction of a patient's eye at a near distance.

FIG. 20 is a modification of the arrangement of FIG. 19, which modification serves as a compact means for locating a principal meridian of an eye 36 in combination with imaging means 38 under the condition of the eye being accommodated for a near distance. It is sometimes necessary to determine, in the process of refracting an eye, whether or not any appreciable change in astigmatism occurs when the eye accommodates for a near distance. In FIG. 19 imaging means 38 has been previously adjusted to represent the distance correction for the eye 36. Slit aperture 87 is then placed at a near distance with respect to eye 36, 40 cm. away, for example, such that the eye can accommodate to bring it into focus. Slit aperture 87 is illuminated from behind by light from the array of slit apertures 90, with positive spherical lens 86' serving to image the slit apertures 90 far enough away from slit aperture 87 that the desired target array of the present invention is produced.

Figure 21:
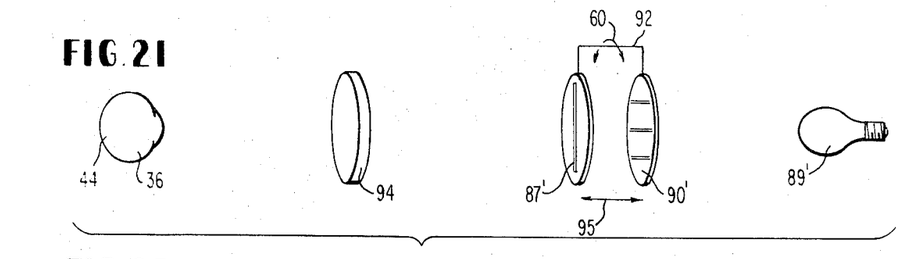
FIG. 21 is a diagrammatic perspective view of another embodiment of the present invention used in an optometer.

FIG. 21 shows the type of slit aperture array of FIG. 19 used in an optometer arrangement. Single slit aperture 87' and array of parallel slit apertures 90' are connected together by conventional connecting means 92 such that slit aperture 87' is at right angles to the array of slit apertures 90'. Light source 89' illuminates the assembly of slit apertures from behind whereby the assembly of slit apertures 90' and 87' produce the desired target array of the present invention. Positive spherical lens 94 is often referred to as the optometer lens and is fixed in position approximately its own focal length away from eye 36. Movement of the assembly of slit apertures 87' and 90', in the axial directions shown by double arrow 95, with respect to the fixed lens 94 serves as the imaging means of the optometer arrangement, replacing the imaging means 38 of the previously described arrangements. The assembly of slit apertures 87' and 90' is also rotatable in the directions of double arrow 60. The arrangement of FIG. 21 serves to illustrate only the simplest optometer arrangement with which the target means of the present invention may be used. Optometers in general provide imaging means with continuously variable dioptric power. Such continuously variable power is usually achieved either by movement of a target in an axial direction or by movement of fixed power imaging means in an axial direction. The target means of the present invention is ideally suited for use with numerous optometer designs.

Figure 22:
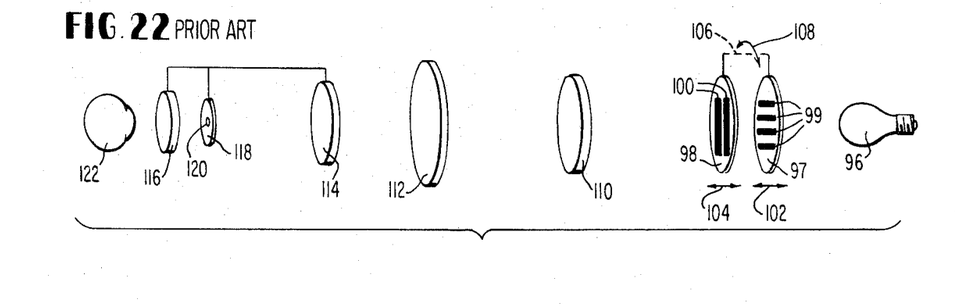
FIG. 22 is a diagrammatic perspective view of a prior art arrangement of optical elements used for locating a principal meridian of an astigmatic spectacle lens.

FIG. 22 shows parts of a prior art arrangement of optical elements used for determining the focal properties of an astigmatic spectacle lens. (See H. F. Kurtz. The Dioptrometer, J. Opt. Soc. Amer. 7(1):103–125, January 1923, particularly page 117). The basics of this arrangement which pertain to the location of a principal meridian are shown in FIG. 22. The target array used is quite similar to the target array of the present invention, and the difference between the two types of target arrays should be pointed out. In FIG. 22, from right to left, light source 96 illuminates from behind glass disks 97 and 98. Glass disk 97 has four parallel opaque lines 99 inscribed upon it with the spaces between the lines 99 approximately equal in width to the lines themselves. Glass disk 98 has two parallel opaque lines 100 inscribed upon it at right angles to lines 99. The two opaque lines 100 are close together forming a narrow linear aperture between them. The aperture between the opaque lines 100 corresponds to the common linear image of the target array of the present invention. The spaces between opaque lines 99 correspond to the second linear images of the target array of the present invention except that these spaces are very much wider in relation to the spacing between them than are the second linear images of the present invention. This is the essential difference between the two target arrays, and the effect of this difference is to make the target array of this prior art arrangement much less sensitive than the target array of the present invention. The lesser sensitivity is compensated for, however, by other parts of the prior art arrangement. Thus, in the present invention, the lateral spacing between the second linear images of the target array should be at least twice the width of the second linear images and preferably at least four times the width. In operational models, the spacing has been at least ten times the image width.

Glass disks 97 and 98 are movable in the axial direction independently from one another as indicated by arrows 102 and 104, but rotatable together by means of linkage 106, shown schematically, in the directions of double arrow 108. Spherical lens 110 is a standard lens of positive power corresponding to the optometer lens 94 in the arrangement of FIG. 21. Lens 112 is the spectacle lens being tested and is placed in the anterior principal focal plane of standard lens 110. Lenses 114 and 116 constitute a lower power (4 to 6 power) astronomical telescope with the reticle 118 located at the common principal focal planes of lenses 114 and 116. Upon the reticle 118 is inscribed a small opaque circular line 120 serving as a fixation mark for the eye 122 of the viewer.

In operation the axial movement of opaque lines 100 with respect to fixed lens 110 constitutes a variable power imaging means, presenting to spectacle lens 112 an image of opaque lines 100 located within a wide range of possible distances from spectacle lens 112. If the image of opaque lines 100 is brought to lie in the focal plane of spectacle lens 112, the bundles of light emerging from the left of spectacle lens 112 will be bundles of parallel rays in which case an aerial image of opaque lines 100 will be formed in the plane of the fixation mark 120 within the telescope. Because of the relatively high power of the eyepiece lens 116, the image of opaque lines 100 appears very much out-of-focus to eye 122 when the image does not lie exactly in the plane of fixation mark 120. Spectacle lens 112 in combination with the telescope objective lens 114 correspond to the optical portion of the patient's eye 36 in FIG. 21. The plane of fixation mark 120 corresponds to the retina 44 of eye 36. The telescope eyepiece lens 116 serves as a high power magnifying glass for the viewer's eye 122 to examine the image formed in the plane of fixation mark 120. If the telescope were absent, the corrected viewer's eye 122 could still detect the condition of parallelism within the bundles of rays emerging from spectacle lens 112, for an image of opaque lines 100 would then be focused directly on the retina of eye 122. Small deviations from parallelism would not be detected, however, for such small deviations would not cause the image formed on the retina of eye 122 to be significantly out-of-focus. Adding the telescope effectively magnifies any small deviations from parallelism within the bundles of light rays emerging from spectacle lens 112, multiplying these deviations by roughly the square of the power of the telescope. Also the telescope presents a small exit pupil to the eye 122 such that small refractive errors of eye 122 do not interfere with the measurement process.

In locating a principal meridian of spectacle lens 112, opaque lines 100 are first moved to the position of best focus as judged by eye 122. The opaque lines 99 are then moved to an out-of-focus position behind the opaque lines 100 whereupon the edges of lines 100 will appear broken or jagged to eye 122 if lines 100 are not parallel to a principal meridian of lens 112. Both sets of opaque lines 99 and 100 are now rotated together until the edges of opaque lines 100 appear straight, thus locating a principal meridian of spectacle lens 112. The precision with which a principal meridian may be located is extremely high, even for spectacle lenses with small astigmatism. This high precision is due partly to the nature of the target means and partly to the fact that there are no significant optical irregularities in the spectacle lens, but the high precision is mostly due to the presence of the telescope.

The telescope of FIG. 22 is not available when locating a principal meridian of a patient's eye. Also the presence of minor optical irregularities in the patient's eye causes difficulty in locating a principal meridian. Therefore, the target array used with a patient's eye must provide an unusually high degree of sensitivity. The target array of FIG. 22, if used directly for locating a principal meridian of a patient's eye, has low sensitivity. If the opaque lines 99 in FIG. 22 are widened appreciably such that the spaces between them become fine slit apertures, the sensitivity of the target array increases markedly, and this altered array now may be used quite effectively to locate a principal meridian of a patient's eye. This altered target array is equivalent to the target array of the present invention.

Another prior art target array used for the location of a principal meridian of a spectacle lens is similar to the target array of FIG. 21. (See U.S. Pat. No. 1,542,112 issued to E. D. Tillyer and also U.S. Pat. No. 1,608,725 issued to B. P. Currier and E. D. Tillyer). However, the linear apertures of this prior art target which correspond to the slit apertures 90 of FIG. 21 are approximately as wide as the opaque spaces between them, and therefore the same limitation in sensitivity is experienced as is experienced in the target array of FIG. 22.

It should be understood that the embodiments of the present invention as described are simply several basic embodiments. Many variations should be obvious to those skilled in the art. For example, the multiple slit apertures 90 of FIG. 19 may be produced instead by the multiple imaging of a single slit aperture. The point aperture 41 and light source 42 in FIGS. 13 through 17 may be replaced by a single lamp with a small filament serving as the point source of light. The lenticular lens 82 of FIG. 15 may be produced in several configurations. The optical paths of many of the embodiments may be compacted by using reflecting means for folding the optical path or refracting means for shortening the optical path.

The test image formed on the retina of the patient's eye may be focused and aligned by the patient himself, or it may be focused and aligned by an examiner using auxiliary optical means to view the retina of the patient's eye. The test image may even be focused and aligned by an auxiliary optical system having appropriate photoelectric detection means.

A particularly valuable but conventional addition to the present invention is beam-splitting means allowing the patient to view the far wall of the examining room and the test image simultaneously, whereby the test image appears to be projected onto the far wall, helping the patient to relax his accommodation.

Another valuable conventional addition to the present invention is the use of monochromatic or near-monochromatic light to form the test image. Somewhat clearer test images are obtained with monochromatic light, making smaller misalignments more easily detectable.

What is claimed is:

1. Apparatus for use in locating a principal meridian of an astigmatic subject optical system, said subject optical system comprising imaging means of variable dioptric power in combination with a patient's eye, said combination of imaging means and eye serving to receive light from said target means and to use said light to form a test image in the vicinity of the retina of said eye for the purpose of examination of said test image; said apparatus comprising:

a target array in combination with rotational means, said target array comprising a plurality of pairs of linear images of light, each of said pairs of linear images being equivalent, with respect to said subect optical system, to an astigmatic image of a point source of light in that the two linear images constituting each pair are situated in different planes one behind the other, said two linear images being oriented at right angles to one another, and said two linear images acting together to provide light to be received by said subject optical system, said light being limited to light which is common to both of said two linear images; said plurality of pairs of linear images of light being disposed in relation to one another such that a first linear image of each pair cooperates with first linear images of all remaining pairs to form a single common linear image, and the second linear images of said pairs are separated laterally from one another as viewed by said subject optical system, the lateral spacing of said second linear images being substantially greater than the width of said second linear images, and said lateral spacing being chosen in conjunction with the distance of each of said second linear images from said common linear image such that when said target array is viewed by said subject optical system and when the imaging means of said subject optical system is varied as necessary to form said test image in the vicinity of said retina, said test image becomes composed of a linear array of linear segments of light, said segments being of sufficient length to overlap one another, said segments forming a substantially straight single line of light when the common linear image of said target array is parallel to a principal meridian of said subject optical system, and said segments forming a jagged or irregular line of light whenever the common linear image of said target array is not parallel to a principal meridian of said subject optical system; said rotational means enablying the orientation of the common linear image of said target array to be changed from one meridian to another of said subject optical system whereby from the appearance of said test image a principal meridian of said subject optical system may be located.

2. Apparatus as in claim 1 where said lateral spacing of said second linear images is at least twice the width of said second linear images.

3. Apparatus as in claim 2 where said lateral spacing between the second linear images is at least four times said width of the second linear images.

4. Apparatus as in claim 3 where said lateral spacing between the second linear images is at least ten times said width of the second linear images.

5. Apparatus according to claim 1 wherein said pairs of linear images of light are produced by the combination of cylindrical lens means and point light source means.

6. Apparatus according to claim 5 wherein said cylindrical lens means comprises a single cylindrical lens, and said point light source means comprises a plurality of point sources of light spaced apart from one another in a direction parallel with a principal meridian of said cylindrical lens.

7. Apparatus according to claim 5 wherein said cylindrical lens means comprises a single cylindrical lens, and said point light source means comprises a single point source of light in combination with multiple imaging means to cause multiple images of said single point source of light to be formed, said multiple images spaced apart from one another in a direction parallel with a principal meridian of said cylindrical lens.

8. Apparatus according to claim 7 wherein said multiple imaging means comprises birefringent optical elements.

9. Apparatus according to claim 7 wherein said multiple imaging means comprises reflecting and beam-splitting optical elements.

10. Apparatus according to claim 7 wherein said multiple imaging means comprises a plurality of prismatic optical elements, said prismatic optical elements disposed laterally to one another across the field of view of said subject optical system.

11. Apparatus according to claim 5 wherein said cylindrical lens means comprises a plurality of cylindrical lenses, said cylindrical lens disposed laterally to one another across the field of view of said subject optical system, and said point light source means comprises a single point source of light.

12. Apparatus according to claim 1 wherein said pairs of linear images of light are produced by the combination of slit aperture means and point light source means.

13. Apparatus according to claim 12 wherein said slit aperture means comprises a plurality of slit apertures spaced laterally from one another across the field of view of said subject optical system, and said point light source means comprises a single point source of light on the far side of said slit apertures from said subject optical system.

14. Apparatus according to claim 12 wherein said slit aperture means comprises a single slit aperture, and said point light source means comprises a plurality of point sources of light on the far side of said slit aperture from said subject optical system, said plurality of point sources of light spaced laterally from one another across the field of view of said subject optical system and disposed in a single line parallel with said slit aperture.

15. Apparatus according to claim 1 wherein each linear image of light of said target array is produced by a slit aperture.

16. Apparatus for locating a principal meridian of an astigmatic subject optical system comprising:
target means for forming a test image at the retina of a patient's eye, such target means comprising a plurality of pairs of linear images of light, the two images constituting each pair being located in different planes one behind the other and oriented at right angles to one another, said two images acting together to provide light to be received by said subject optical system, said light being limited to light which is common to both of said two linear images, said plurality of pairs of linear images of light being disposed in relation to one another so that a first linear image of each pair cooperates with first linear images of all remaining pairs to form a single common linear image, and the second linear images of said pairs being separated laterally from one another as viewed by said subject optical system, the lateral spacing of said second linear images being substantially greater than the width of said second linear images, and said lateral spacing being a function of the distance of each of said second linear images from said common linear image so that said test image becomes composed of a linear array of linear segments of light, said segments being of sufficient length to overlap one another, said segments forming a substantially straight single line of light when the said single common linear image is parallel to a principal meridian of said subject optical system, and said segments forming a jagged or irregular line of light whenever the said single common linear image is not parallel to a principal meridian of said subject optical system;

means for rotating said target means so that said straight single line of light can be formed whereby said principal meridian of said subject optical system can be located.

17. Apparatus as in claim 16 where said lateral spacing of said second linear images is at least twice the width of said second linear images.

18. Apparatus as in claim 17 where said lateral spacing between the second linear images is at least four times said width of the second linear images.

19. Apparatus as in claim 18 where said lateral spacing between the second linear images is at least 10 times said width of the second linear images.

20. Apparatus as in claim 16 where said subject optical system includes the human eye and said predetermined point is the retina thereof.

21. Apparatus according to claim 16 wherein said target means comprises cylindrical lens means and point light source means.

22. Apparatus according to claim 21 wherein said cylindrical lens means comprises a single cylindrical lens, and said point light source means comprises a plurality of point sources of light spaced apart from one another in a direction parallel with a principal meridian of said cylindrical lens.

23. Apparatus according to claim 21 wherein said cylindrical lens means comprises a single cylindrical lens, and said point light source means comprises a single point source of light in combination with multiple imaging means to cause multiple images of said single point source of light to be formed, said multiple images spaced apart from one another in a direction parallel with a principal meridian of said cylindrical lens.

24. Apparatus according to claim 23 wherein said multiple imaging means comprises birefringent optical elements.

25. Apparatus according to claim 23 wherein said multiple imaging means comprises reflecting and beam-splitting optical elements.

26. Apparatus according to claim 23 wherein said multiple imaging means comprises a plurality of prismatic optical elements, said prismatic optical elements disposed laterally to one another across the field of view of said subject optical system.

27. Apparatus according to claim 21 wherein said cylindrical lens means comprises a plurality of cylindrical lenses, said cylindrical lenses disposed laterally to one another across the field of view of said subject optical system, and said point light source means comprises a single point source of light.

28. Apparatus according to claim 16 wherein said target means comprises slit aperture means and point light source means.

29. Apparatus according to claim 28 wherein said slit aperture means comprises a plurality of slit apertures spaced laterally from one another across the field of view of said subject optical system, and said point light source means comprises a single point source of light on the far side of said slit apertures from said subject optical system.

30. Apparatus according to claim 28 wherein said slit aperture means comprises a single slit aperture, and said point light source means comprises a plurality of point sources of light on the far side of said slit aperture from said subject optical system, said plurality of point sources of light spaced laterally from one another across the field of view of said subject optical system and disposed in a single line parallel with said slit aperture.

31. Apparatus according to claim 16 wherein said target means comprises at least one slit aperture.

* * * * *